US007660524B2

United States Patent
Kallstenius

(10) Patent No.: US 7,660,524 B2
(45) Date of Patent: Feb. 9, 2010

(54) TEMPERATURE COMPENSATION FOR TRANSMISSION BETWEEN NODES COUPLED BY A UNIDIRECTIONAL FIBER RING

(75) Inventor: Thomas Kallstenius, Luxembourg (LU)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 575 days.

(21) Appl. No.: 10/596,852

(22) PCT Filed: Dec. 28, 2004

(86) PCT No.: PCT/SE2004/002042
§ 371 (c)(1),
(2), (4) Date: Jun. 27, 2006

(87) PCT Pub. No.: WO2005/064827
PCT Pub. Date: Jul. 14, 2005

(65) Prior Publication Data
US 2007/0127919 A1    Jun. 7, 2007

Related U.S. Application Data

(60) Provisional application No. 60/532,628, filed on Dec. 29, 2003.

(51) Int. Cl.
H04J 3/16    (2006.01)
G02B 6/02    (2006.01)
H04L 7/00    (2006.01)

(52) U.S. Cl. .................................. 398/4; 398/3; 398/5
(58) Field of Classification Search .................. 398/3–5
See application file for complete search history.

(56) References Cited

U.S. PATENT DOCUMENTS

| | | | | |
|---|---|---|---|---|
| 4,332,026 A * | 5/1982 | Alvarez et al. .............. 370/347 |
| 4,725,728 A | 2/1988 | Brininstool et al. |
| 4,764,980 A | 8/1988 | Sakaguchi et al. |
| 4,893,318 A * | 1/1990 | Potash et al. ................. 375/358 |
| 5,149,961 A * | 9/1992 | Arnold et al. ........... 250/227.11 |
| 5,210,763 A * | 5/1993 | Lewis et al. ..................... 372/26 |
| 5,299,044 A * | 3/1994 | Mosch et al. ................... 398/35 |
| 5,317,571 A * | 5/1994 | Marcel et al. ................ 370/508 |
| 5,355,368 A * | 10/1994 | Dore et al. .................... 370/296 |
| 5,459,607 A * | 10/1995 | Fellows et al. .............. 398/154 |
| 5,493,629 A * | 2/1996 | Stange ......................... 385/125 |
| 5,513,194 A * | 4/1996 | Tamura et al. .................. 372/6 |
| 5,633,872 A * | 5/1997 | Dinkins ....................... 370/312 |
| 5,805,983 A * | 9/1998 | Naidu et al. .............. 455/67.16 |
| 6,195,046 B1* | 2/2001 | Gilhousen .................... 342/457 |
| 6,307,988 B1* | 10/2001 | Eggleton et al. .............. 385/37 |
| 6,356,386 B1* | 3/2002 | Denkin et al. ................ 359/337 |
| 6,442,140 B1* | 8/2002 | Kirschenbaum .......... 370/236.1 |
| 7,123,589 B1* | 10/2006 | Dawes et al. ................. 370/248 |
| 7,272,309 B1* | 9/2007 | Tamil et al. .................... 398/47 |
| 7,274,879 B1* | 9/2007 | Sandler et al. .............. 398/147 |
| 7,323,677 B1* | 1/2008 | Wang ..................... 250/227.14 |
| 7,489,638 B2* | 2/2009 | Keslassy et al. ............. 370/238 |
| 2005/0226214 A1* | 10/2005 | Keslassy et al. ............. 370/351 |
| 2007/0127919 A1* | 6/2007 | Kallstenius .................... 398/25 |

* cited by examiner

Primary Examiner—Ken N Vanderpuye
Assistant Examiner—Danny W Leung

(57) ABSTRACT

Transmissions over a unidirectional optical fiber coupling multiple nodes are compensated for temperature-induced effects. A round-trip delay time is determined for a signal sent from a first node to travel around the unidirectional optical fiber loop and be received back at the first node. That measured round-trip delay time is then used to account for temperature-induced effects on signal transmissions over the unidirectional optical fiber loop. This temperature compensation is particularly beneficial in applications that require a high level of timing accuracy.

22 Claims, 8 Drawing Sheets

TEMPERATURE COMPENSATION FOR TRANSMISSION BETWEEN NODES COUPLED BY A UNIDIRECTIONAL FIBER RING

RELATED APPLICATION

Priority is claimed to U.S. provisional patent application, Ser. No. 60/532,628, filed on Dec. 29, 2003, the entire contents of which are incorporated by reference.

TECHNICAL FIELD

The technology described relates temperature compensation for transmissions between remotely located nodes. Advantageous example applications include time synchronization of nodes coupled in a unidirectional, optical fiber ring or loop, and in the context of mobile radio communications, to measurements used for determining a mobile terminal location.

BACKGROUND AND SUMMARY

Absolute time synchronization (where the term "absolute" refers to the time-of-day) of nodes in a distributed network is important for many operations, e.g., scheduling of distributed tasks and accurately logging the occurrence of various events. In a radio access network (RAN) application, absolute time synchronization and/or very accurate timing measurements are necessary or desirable in various cellular radio applications like soft and softer handover, diversity operations in general, GPS-assisted positioning, round-trip-time (RTT)-based positioning, etc. Several such applications are now described.

FIG. 1 illustrates a diversity communication in a distributed network that uses a main-remote concept where a single radio base station is split into a main unit and one or remote units. A main base station (BS) unit 10 contains or is associated with a central system clock (CSC). The main base station unit 10 is coupled to a remote base station unit 1 and a remote base station unit 2, (both remote units are labeled 14), via a unidirectional optical fiber ring or loop 12. With diversity communication, a mobile terminal (MT) 16 transmits signals to and receives signals from more than one remote base station unit 14 at the same time. For simplicity, both the main unit and the remote units are referred to as nodes with the understanding that neither a main base station node nor a remote base station node is a stand-alone, complete base station.

Synchronization requirements between the main and remote base station nodes depend on the architectural level of diversity. Consider an example of transmitter diversity in a third generation (3G) mobile radio communications system which employs code division multiple access (CDMA) technology. In CDMA communications, CDMA modulation involves "spreading" information symbols using multiple "chips." That is why CDMA is also referred to as "spread spectrum" technology. According to the specification for 3G mobile radio communications systems, (3GPP TS 25.104 V5.7.0, section 6.8.4), the absolute time alignment or synchronization error should not exceed ¼ $T_c$, where $T_c$ represents a "chip" time period, which corresponds 65 nanoseconds (ns).

Another application relates to the Global Positioning System (GPS), which is a satellite-based positioning system providing excellent radio navigation service. GPS can be combined with cellular applications, in which case, it is referred to as Assisted-GPS (A-GPS). For A-GPS, approximately a 5 microsecond (µs) absolute time accuracy is desirable. See, for example, 3GPP TS 25.133 V5.7.0 (section 9.2.10).

Yet another application relates to round-trip-time (RTT) measurements used to determine a location of a mobile terminal. The RTT is the propagation time of a signal traveling from the mobile terminal to the remote base station and back. FIG. 2 illustrates an RTT example where the mobile terminal 16 transmits an RTT signal received by a remote base station node 14, which sends that signal around the fiber loop 12 to the main base station 10 that contains the central clock CSC. The main base station 10 sends that RTT signal around the rest of the fiber loop 12 to the remote base station 14, which then sends it back to the mobile terminal 16. The round-trip time RTT is the time that a signal transmitted from the mobile terminal 16 takes to traverse the radio interface, be received by the remote base station node 14, to be transmitted by the remote base station node 14 back to the mobile terminal 16 over the radio interface, and detected by the mobile terminal 16.

Because the remote base station node 14 is a "dumb" base station node and the "intelligence" of the base station is at the main base station 10, the RTT signal received from the mobile terminal 16 must be routed around the fiber loop 12 through the main base station 10 before it is returned to the remote base station node 14 for transmission back to the mobile terminal. The round-trip delay (RTD) corresponds to the time it takes for the signal transmitted from the remote base station node 14 around the fiber loop 12 to the main base station 10 to be received back at the remote base station node 14. Hence, the RID must be determined and subtracted from the total time in order for the mobile terminal to calculate the actual round-trip time (RTT) measurement. It is desirable that the accuracy of this RTD measurement around the fiber loop be better than $\pm T_c/2$ ($\pm 130$ ns), according to 3GPP TS 25.133 V5.7.0 (section 9.2.8.1).

In time-of-arrival positioning (TOA), the mobile terminal location/position calculation is based on the propagation delay of the radio signal from the transmitter (the remote base station node 14) to the mobile terminal (MT). When there are at least three TOA measurements available from different remote base station nodes, shown in FIG. 3 as $t_1$-$t_3$, together with other information, e.g., the geographic position of the remote base station nodes, the mobile terminal can determine the geographic position using triangulation calculations. The absolute time synchronization of the three remote base station nodes must be at a level of accuracy on the order of a few nanoseconds. Indeed, a 10 nanosecond uncertainty contributes to roughly a 3 meter error in the RTT-based position estimate, as explained in 3GPP TS 25.305, version 5.4.0, section 9.2

In current radio access networks (RAN) that employ a main-remote base station configuration like that shown in FIGS. 1-3, dedicated communication links are used to connect the main base station node to each remote base station node. Frequency synchronization is obtained using a clock-recovery method based on a phase-locked loop or the like. Absolute time synchronization may be achieved in many node connection topologies using round trip delay (RTD) measurements based on the fact that the uplink from remote-to-main node and the downlink remote-to-main node are symmetrical. When these nodes are coupled to a network with other traffic, switches, routers etc., GPS synchronization may be used to obtain synchronization in the remote base station nodes, assuming each remote radio base station has a GPS receiver either connected to it or in close vicinity.

But there are several drawbacks with topologies that rely on GPS-based synchronization. First, GPS receivers are expensive. Second, GPS synchronization may be less suitable for indoor systems since the GPS signal often cannot penetrate thick walls and cannot be used in tunnels, subways, and the like. Third, some countries may not accept a synchronization solution based on GPS which allows the possibility of the mobile network being effectively disabled if some hostile entity gains control of the GPS system.

As an alternative, an unidirectional fiber optic ring is an attractive network topology for a main-remote base station configuration used in a RAN. It supports synchronous, time division multiplexed (TDM) traffic without additional switches, splitters, add-drop multiplexers, etc. Synchronous traffic advantageously provides inherent frequency synchronization. In addition, a unidirectional fiber ring requires only a minimal number of transceivers in each node—one receiver and one transmitter.

But absolute time synchronization is problematic with unidirectional fiber rings. Although frequency synchronization can be achieved using a standard clock-recovery method, it is not possible to absolute time synchronize individual nodes using roundtrip measurements. This is because the uplink and the downlink are generally not symmetrical in this case, and optical fiber transmission delay is temperature dependent. If the temperature varies even several degrees, the time delay associated with the particular optical length may vary significantly—particularly with respect to the exacting synchronization and/or other time constraints imposed by many applications.

The inventor developed technology that overcomes these temperature-induced timing problems associated with a unidirectional optical fiber ring topology that couples multiple nodes. A round-trip delay time is measured for a signal sent from a first node to travel around the unidirectional optical fiber loop and be received back at the first node. The measured round-trip delay time is used to account for temperature-induced effects on transmissions over the unidirectional optical fiber loop.

In accordance with one aspect of the technology, first and second round-trip delay times are measured with the second round-trip delay time being measured some time after the first. A temperature-induced delay time correction is determined using the first and second round-trip delay times. Based on the determined temperature-induced delay time correction, a time difference is determined between the first node and more and more other nodes coupled to the unidirectional fiber loop. The multiple nodes may then be accurately time-synchronized taking into account the determined temperature-induced delay time correction. As a result of the temperature-induced delay time correction, a timing difference between the synchronized notes is in the range of one nanosecond to several microseconds.

Adjacent nodes in the unidirectional loop are coupled together by an optical fiber link. A time delay is determined for each one of the links. The link time delays are then used to determine the time difference between the first node and the one or more other nodes coupled by the fiber loop. In one example implementation, optical time domain reflectometry (OTDR) is used to determine the time delay associated with each fiber link. But other techniques may be used as well. The temperature-induced time delay correction is based on a difference between the first and second round-trip delay times and the link time delays. The first node may then generate and send a time synchronization message based on a temperature-induced delay time correction for each node to that corresponding node so that the absolute time at that other node is synchronized with the absolute time at the first node.

In another aspect of the technology, one or more remote nodes send a timestamp message to the main node indicating a local time at that remote node. The main node then determines a respective local time difference between the time in each received timestamp message and the local time at the main node. The main node then may use those local time differences in subsequent determinations related to or affected by such local timing differences.

In another example main-remote radio base station embodiment, the main node is a main base station unit that includes processing circuitry and a central clock source. The remote nodes are remote base station units that include radio transceiving circuitry for communicating over a radio interface with a mobile radio terminal. The mobile radio terminal determines one or more round-trip times (RTTs). The RTT corresponds to the time for an RTT message transmitted by the mobile terminal to travel to the remote base station unit and be returned from the remote base station unit to the mobile terminal. The mobile terminal corrects the RTT using an accurately measured round-trip delay time RTD associated with the fiber loop which accounts for current temperature effects on the RTD.

DETAILED DESCRIPTION

The following description, for purposes of explanation and not limitation, sets for the specific details, such as particular components, electronic circuitry, signaling, techniques, standards, etc. in order to provide an understanding of the described technology. But it will be apparent to one skilled in the art that other embodiments may be practiced apart from the specific details. In other instances, detailed descriptions of well-known methods, devices, techniques, etc. are omitted so as not to obscure the description with unnecessary detail. For example, one advantageous application is a radio access network that employs a main-remote base station functionality. The main base station unit may communicate with the remote base station units using, for example, the common public radio interface (CPRI) specification. But other interfaces, as well as other applications, may be employed. Individual function blocks are shown in the figures. Those skilled in the art will appreciate that the functions of those blocks may be implemented using individual hardware circuits, using software programs and data in conjunction with a suitably programmed microprocessor or general purpose computer, using application specific integrated circuitry (ASIC), and/or using one or more digital signal processors (DSPs).

Figure 4:
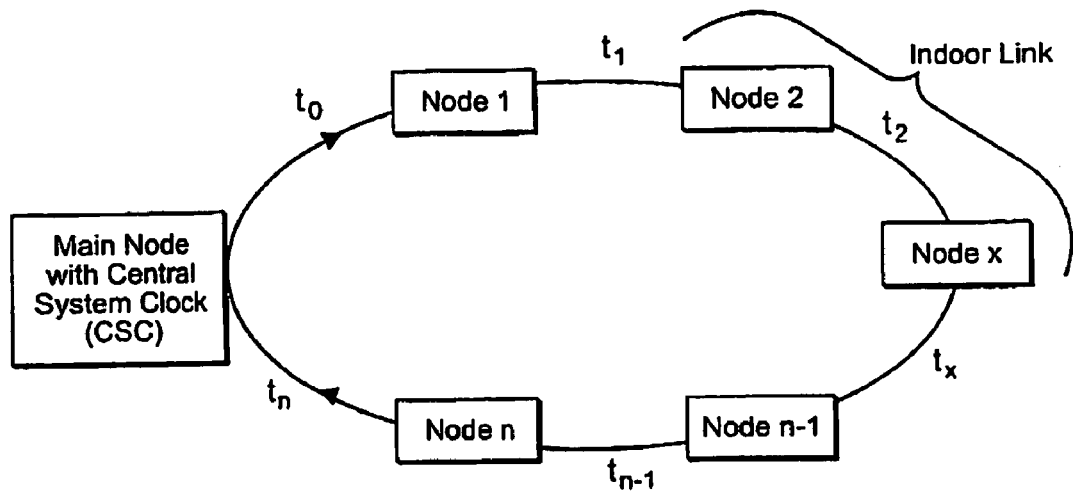
FIG. 4 illustrates a general unidirectional ring topology showing a main node coupled to multiple remote nodes.

Consider the distributed nodes coupled in a unidirectional ring configuration shown in FIG. 4. A main node includes a central system clock (CSC) and is coupled to node 1 via an outdoor fiber link having an associated time delay $t_0$. Node 1 is coupled to node 2 via an outdoor fiber link having an associated time delay $t_1$. Node 2 is coupled to node x via an indoor fiber link having an associated time delay $t_2$. Node x is coupled to node n-1 via an outdoor fiber link having an associated time delay $t_x$. Node n-1 is coupled to node n via an outdoor fiber link having an associated time delay $t_{n-1}$. Node n is coupled to the main node via an outdoor fiber link having an associated time delay $t_n$. Together the links form a unidirectional fiber loop.

Figure 5:
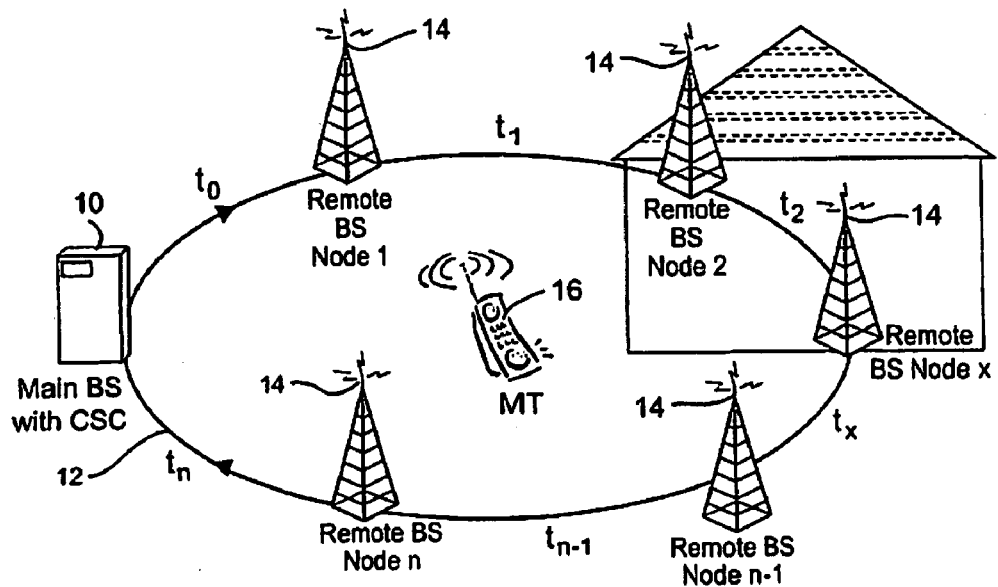
FIG. 5 illustrates an application of the general topology shown in FIG. 4 to a main-remote base station configuration.

Another example embodiment shown in FIG. 5 is similar to the general configuration shown in FIG. 4 but is applied to a main-remote base station environment. The CSC resides in a main base station 10 node and the remote base station nodes 14 are coupled to the main base station node 10 via a unidirectional fiber ring 12. In FIG. 5, the optical fiber link connecting remote base station node 2 and node 3 is located inside a building, and the other optical fiber links are located outside. The mobile terminal (MT) 16 is communicating with one or more remote base station nodes 14, the latter for diversity and/or positioning services.

In both FIGS. 4 and 5, the nodes should be frequency and absolute time synchronized to the CSC. During installation of the nodes, Optical Time Domain Reflectometry (OTDR) is used to determine the fiber link distance between the nodes, and ultimately, the time delay associated with the link. OTDR uses a light backscattering technique to analyze an optical fiber. An OTDR instrument takes a snapshot of the fiber's optical characteristics by sending a high-powered light pulse into one end of the fiber and measuring the light scattered back toward the light OTDR instrument. OTDR is used during fiber installation to detect faults in the fibers, and computations are made to determine the size and distance to events encountered along the fiber. OTDR can be used to determine the fiber length with accuracy less than one meter, which corresponds to a five nanosecond time (propagation) delay in the time domain. This nanosecond order of resolution is very helpful in light of the absolute time synchronization requirements on the order of a few nanoseconds described in the background. The link delays determined using OTDR for each link are stored in the main node that includes or is associated with the CSC for use in absolute time synchronization of the nodes. The link delays may be determined using a technique or procedure other than OTDR Referring to FIG. 6, the main node 10 includes a central system clock (CSC) 20 coupled to a processor 22. Although the central system clock 20 is shown as part of the main node, it may be separate from the main node. The processor 22 is coupled to a buffer 24, which stores data packets to be sent and received, and a transceiver 26 for sending and receiving data packets over a communications interface (I/F), e.g., a CPRI interface in a main-remote radio base station application. Each remote node includes a processor 30, a local clock 32, a buffer 34 for storing packets to be sent and received, and a transceiver 36 for sending and receiving data packets over the loop. Blocks 30-36 communicate over a bus 38. In both the main node and the remote node, the clock may be comprised of a frequency oscillator and a timer.

Figure 7:
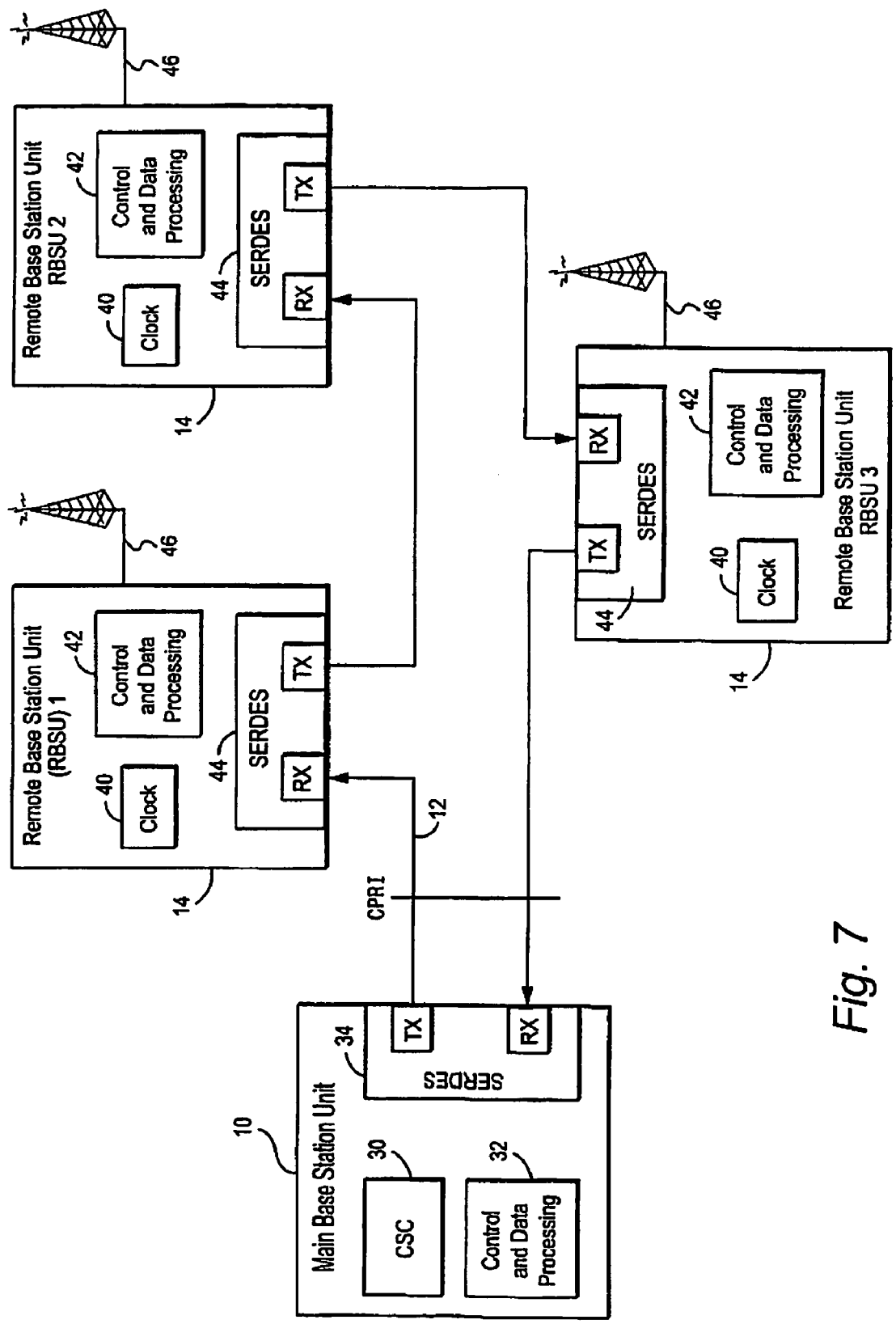
FIG. 7 illustrates a function blocked diagram for a main base station unit coupled to multiple remote base station units coupled in a unidirectional fiber ring.

FIG. 7 illustrates a function block diagram showing an application to a main-remote base station configuration that may be employed in a radio access network. A main base station unit 10 is coupled via a unidirectional fiber loop 12 to multiple remote base station units (RBSUs) 14. The main base station unit 10 includes (or is associated with) a central system clock 30, control and data processing circuitry 32, and a serializer/deserializer (SERDES) 34, which includes a transmitter (TX) and a receiver (RX) for transmitting and receiving information over the unidirectional fiber loop 12. The main base station unit 10 may communicate information with the remote base station units 14 using a CPRI protocol, although other communication protocols could be employed. Each remote base station unit includes a local clock 42, control and data processing circuitry 42, a SERDES 44 along with a transmitter and a receiver, and an antenna 46.

Temperature changes present a timing problem with a unidirectional fiber ring because those temperature changes change the delay times through the fiber links. For other network topologies, roundtrip delay measurements towards the nodes can be used to continuously measure and account for variations in link delays. But in a unidirectional fiber ring, roundtrip measurements usually cannot be used to estimate the fiber delay towards a particular node because the uplink loop distance and downlink loop distance are usually not symmetrical for a particular node in a unidirectional fiber loop. In other words, moving clockwise around the loop, the fiber distance from the main node to a remote node is usually not the same as that from the remote unit to the main node continuing clockwise around the loop. As a result, temperature compensation is needed so that timing accuracy for unidirectional loop on the order of some nanoseconds is not jeopardized by temperature-induced delay variations along the loop.

Temperature-induced change in time-of-flight (TOF) of a light signal through an optical fiber is caused by two effects: the temperature dependence of the fiber's group index and the change in physical fiber length with temperature. A theoretical estimation of the TOF change at a light wavelength of 1310 nm with a group index of 1.467 is 75 ps/° C./km. The change in fiber length and group index length each contribute to this change in TOF estimated value. Consider, as an example, a unidirectional ring 50 km in circumference. If an absolute time synchronization "budget" of 10 ns can be allocated for temperature changes, a temperature variation of only 3° C. can be tolerated: 10 ns=75 ps/° C./km·50 km·$\Delta T$ => $\Delta T$=3° C.

Improved timing accuracy is achieved using temperature compensation determined by measuring one or more roundtrip delay times (RTDs) around the unidirectional loop. This temperature compensation accounts for the fact that some links in the fiber loop may be affected by temperature variations more than others, e.g., outdoor links as compared to indoor links as shown in FIGS. 4 and 5.

Three, non-limiting, example temperature compensation embodiments are described. In a first "synchronization of nodes" example embodiment, all nodes in the ring are absolute time synchronized. In a second "centralized delay compensation in the CSC" example embodiment, the main node determines absolute time deviations for each node in the loop.

Simply knowing those time differences may be all that is necessary. Adjustments may not need to be made at each node, which may be beneficial, e.g., to prevent time transients which can occur when remote clocks are adjusted. The third example embodiment is a "round-trip time" (RTT) positioning embodiment useful in mobile radio position determination calculations.

For the "synchronization of nodes" example embodiment, link delays are initially determined using OTDR or other technique when a node is installed in the fiber loop. The main node associated with the CSC subsequently measures the round trip delay (RTD) of the unidirectional fiber ring. Based on the recent round trip delay (RTD) measurements and on OTDR fiber link delay measurements made during node installation, the main node calculates and sends time synchronization messages to each remote node When a remote node receives its message, it adjusts its local clock so that it is synchronized with the CSC.

More specifically, when a node is installed in the loop, OTDR is used to determine the fiber delay $t_i$, for each link, at a present temperature. At the same time, the round trip delay (RTD) time $t_{RTD}$ is measured to obtain an average value:

$$\overline{t_{RTD}} = \sum_{i=0}^{n} t_i + n \cdot t_{process} \quad (1)$$

where n is the number of nodes, and $t_{process}$ is the signal processing time in each node needed to forward a received signal to the next node along the fiber.

Synchronization messages, $M_x$, may now be sent from the main node associated with the CSC to each remote node "x" to obtain absolute time synchronization between the nodes:

$$M_x \left\{ t_x = t_{CSC} + \sum_{i=0}^{x-1} t_i + (x-1) \cdot t_{process} \right\} \quad (2)$$

where $M_x$ is the message from the main node to remote node x; $t_x$ is the local time in remote node x upon arrival of $M_x$ in order to be synchronized to the CSC, $t_{CSC}$ is the local time in the CSC upon dispatch of the message $M_x$.

At a later time, the absolute time synchronization needs to be updated. The synchronization messages from the main node must accommodate any temperature changes that might have occurred. The main node measures the average round trip time again:

$$\overline{t'_{RTD}} = \sum_{i=0}^{n} t_i(1 + \varepsilon_i) + n \cdot t_{process} \quad (3)$$

where $\varepsilon_i$ is a factor which corresponds to the effect of temperature on the fiber loop delay and $t_i$ refers to the link delays obtained by OTDR (or other method) during installation. The fiber links are then separated into two categories: links (1) subjected to and (2) not subjected to substantial temperature variations. The former (1) is labeled "affected," and the latter (2) is labeled "unaffected." Equation (3) is then expressed as:

$$\overline{t'_{RTD}} = \sum_{i=0,unaffected}^{n} t_i + (1+\varepsilon) \sum_{i=0,affected}^{n} t_i + n \cdot t_{process} \quad (4)$$

where it is assumed that fiber links affected by temperature variations are affected approximately by the same delay factor $\varepsilon$. From Eqs. (1) and (4), $\varepsilon$ can be calculated as:

$$\varepsilon \left[ \overline{t'_{RTD}} - \overline{t_{RTD}} \right] \bigg/ \sum_{i=0,affected}^{n} t_i \quad (5)$$

Accordingly, modified synchronization messages, $M'_x$, can now be determined and sent from the CSC to each node x to obtain an absolute time synchronization:

$$M'_x \left\{ \begin{array}{l} t_x = t_{CSC} + \sum_{i=0,unaffected}^{x-1} t_i + \\ (1+\varepsilon) \sum_{i=0,affected}^{x-1} t_i + (x-1) \cdot t_{process} \end{array} \right\} \Rightarrow \quad (6)$$

$$M'_x \left\{ t_x = t_{CSC} + \sum_{i=0}^{x-1} t_i + C_X + (x-1) \cdot t_{process} \right\}$$

where $C_x$ is a correction term of the original synchronization message $M_x$ (compare Eqs. (4) and (6)), which can be expressed as:

$$C_X = \left[ \overline{t'_{RTD}} - \overline{t_{RTD}} \right] \cdot \left[ \sum_{i=0}^{x-1} t_i \bigg/ \sum_{i=0}^{n} t_i \right]_{affected} \quad (7)$$

Thus, the local time in each remote node is synchronized to the central clock associated with the main node based on that central clock time, the originally determined fiber link delays, a correction term that is based on the difference between two measured round-trip delay times around the unidirectional fiber loop that includes the signal processing time delay each node needs to forward the received signal on to the next node.

Figure 6:
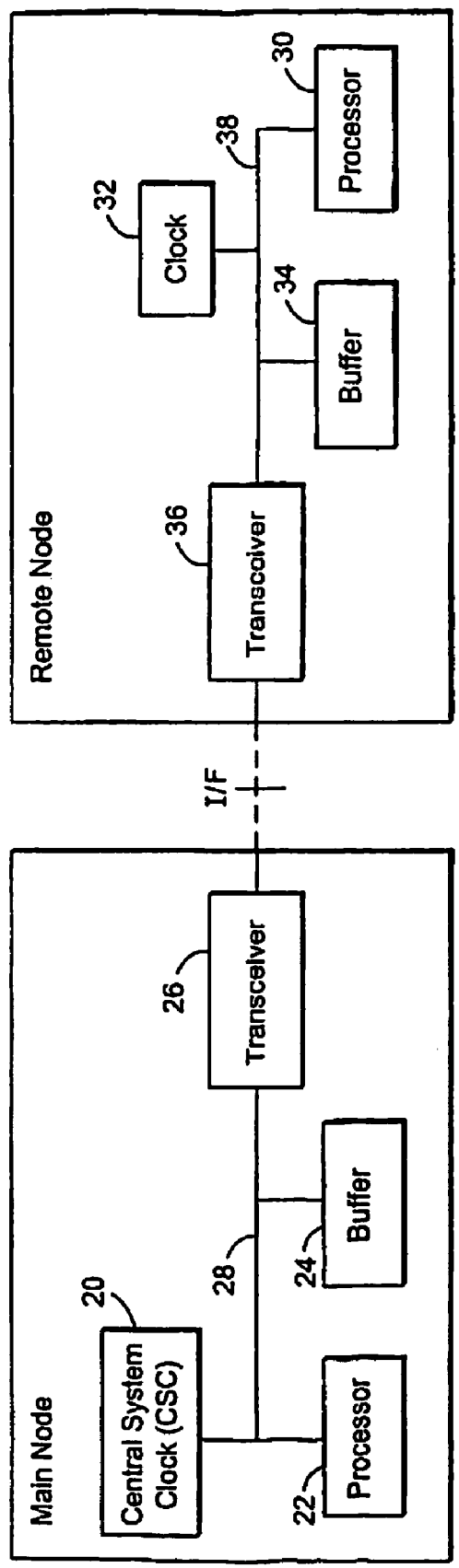
FIG. 6 is a function block diagram for a main node and remote node.

The calculations set forth in equations (1)-(7) are made by the processor 22 shown in FIG. 6 or by the control and data processing circuitry 32 shown in FIG. 7.

Figure 8:
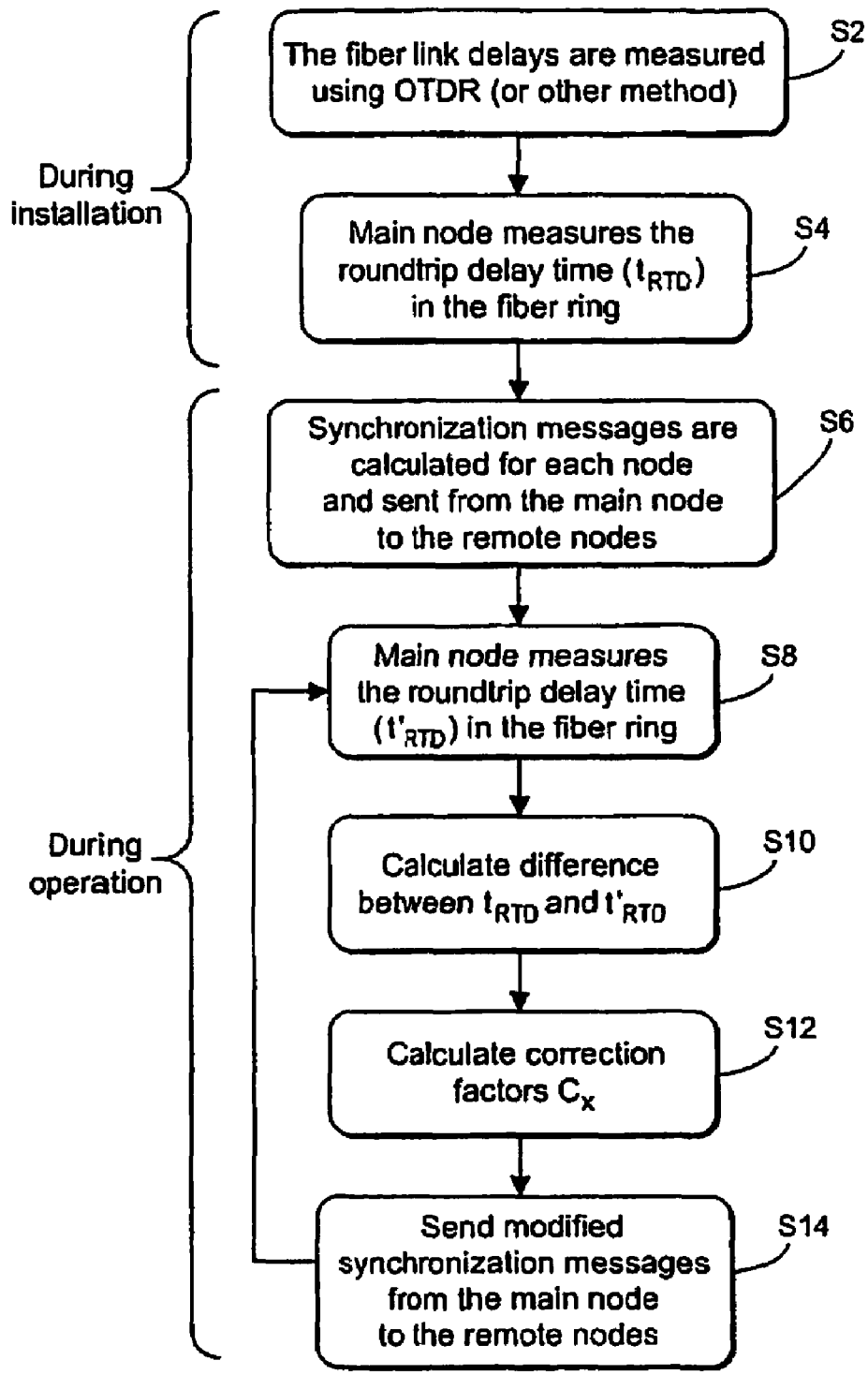
FIG. 8 is a flow chart diagram illustrating example procedures in accordance with the first, non-limiting, example embodiment.

FIG. 8 is a flow chart diagram illustrating example procedures that may be used to implement the first, non-limiting, example embodiment. During installation, signal transmission delays associated with each fiber link connecting adjacent nodes in a unidirectional loop are measured using optical time domain reflectometry (OTDR) or some other method (step S2). The main node then measures the round-trip time (RTD) around the fiber ring at the current temperature (step S4). During operation, synchronization messages are calculated for each node and sent from the main node to the remote nodes (step S6). The main node subsequently re-measures the round-trip time delay (RTD) around the fiber ring (step S8). The main node calculates the difference between the recent round-trip delay and the round-trip time delay determined during installation (step S10). Correction factors $C_x$ are then calculated for each node in accordance with equation (7). The main node then sends modified synchronization messages ($M'_x$) generated in accordance with equation (6) to the corresponding remote node (step S14). Control then returns to step S8 after some period of time to repeat the procedures in steps S8-S14.

In a second, example embodiment, centralized delay compensation is implemented in the main node associated with the CSC. The remote nodes send in "time stamp" messages that include the local time at the remote node to the main node. The main node calculates a local time difference ($\delta_x$) between the absolute time in each remote node x and the CSC time ($t_{scs}$) in the main node as follows:

$$t_x = t_{CSC} + \delta_x \quad (8)$$

where $t_x$ is the local time in node x included in the timestamp message, and $\delta_x$ is the local time difference between node x and the CSC.

Using the equations (1)-(7), it can be shown that:

$$\delta_x = \sum_{i=x}^{n} t_i + D_X + (n-x) \cdot t_{process} - \Delta t_x \quad (9)$$

where $\Delta t_x$ is the time difference between the local time in the CSC upon receipt of the timestamp message $m_x(t_x)$ from node x, as measured by the main node:

$$\Delta t_x = t_{CSC} - m_x \quad (10)$$

$D_x$ is a temperature correction term, which is slightly different from $C_x$:

$$D_x = \left[ \overline{t'_{RTD}} - \overline{t_{RTD}} \right] \cdot \left[ \sum_{i=x}^{n} t_i \bigg/ \sum_{i=0}^{n} t_i \right]_{affected} \quad (11)$$

Figure 9:
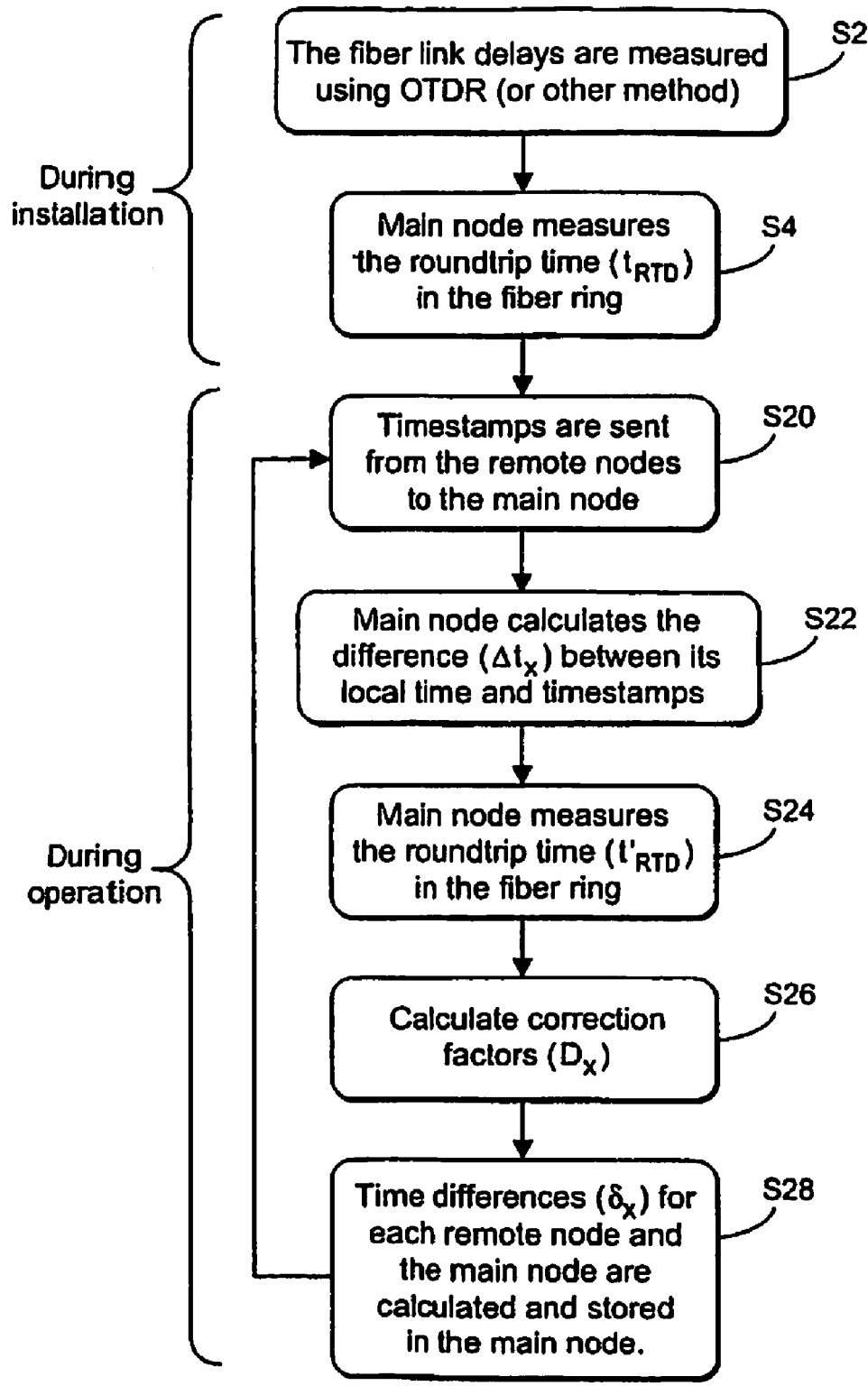
FIG. 9 is a function blocked diagram illustrating example procedures for a second, non-limiting, example embodiment.

FIG. 9 illustrates example procedures for implementing the second, non-limiting example embodiment. Steps S2 and S4 are performing in the same fashion with respect to FIG. 8. During operation, each remote node sends a time stamp to the main node indicating its local time (step S20). The main node calculates the difference ($\Delta t_x$) between its local CSC time and each time stamp time in accordance with equation (10) (step S22). The main node measures the round-trip time in the fiber ring (step S24). Correction factors ($D_x$) are then calculated in accordance with equation (11) (step S26). The main unit then calculates the respective time differences for each remote node (as compared to the CSC local time at the main unit) and stores them at the main node (step S28). Those stored time differences may be used to compensate information received and/or transmitted from the main unit. This has the benefit than any time transients associated with adjusting clocks at the remote nodes are avoided. Alternatively, those time differences could be used, if desired, to adjust the local time at each remote node.

Figure 1:
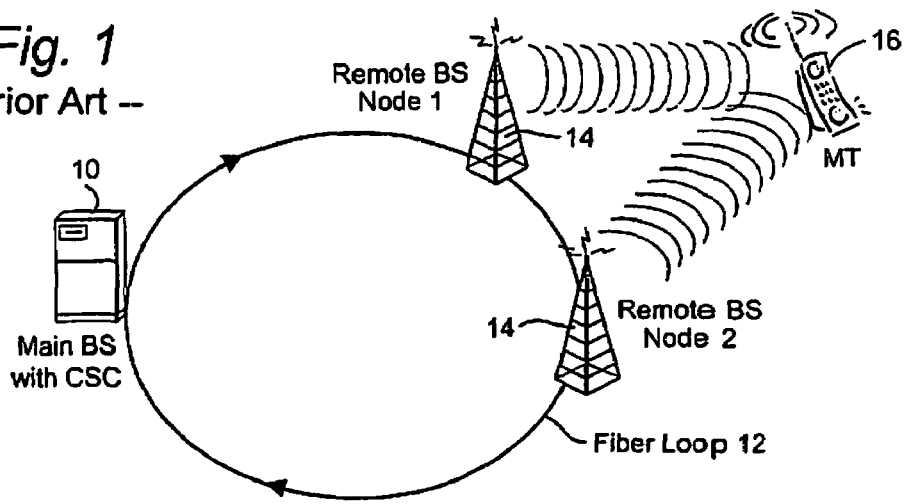
FIG. 1 illustrates a main-remote base station configuration in a unidirectional ring topology.
Figure 2:
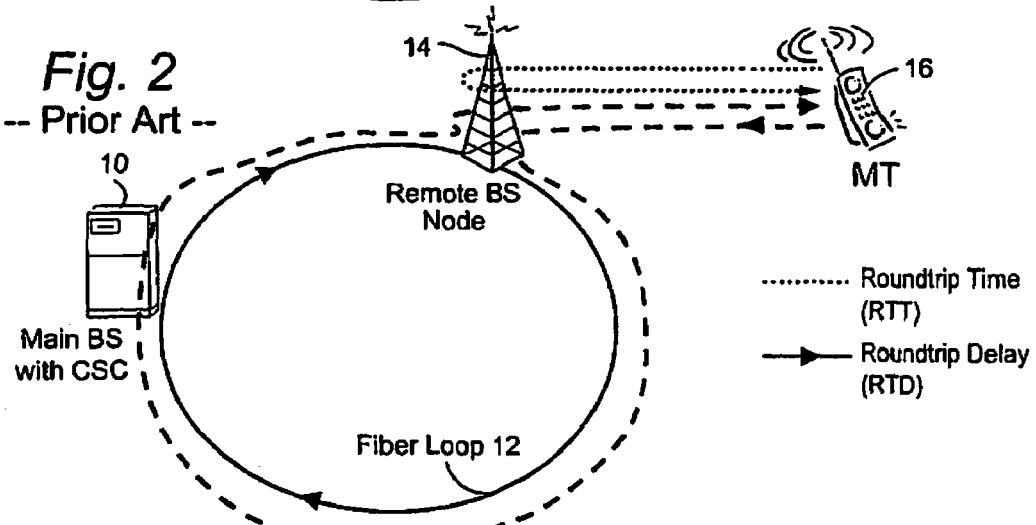
FIG. 2 illustrates a round-trip delay (RTD) associated with the unidirectional fiber loop which must be taken into account in round-trip time (RTT) measurements made by the mobile terminal.
Figure 3:
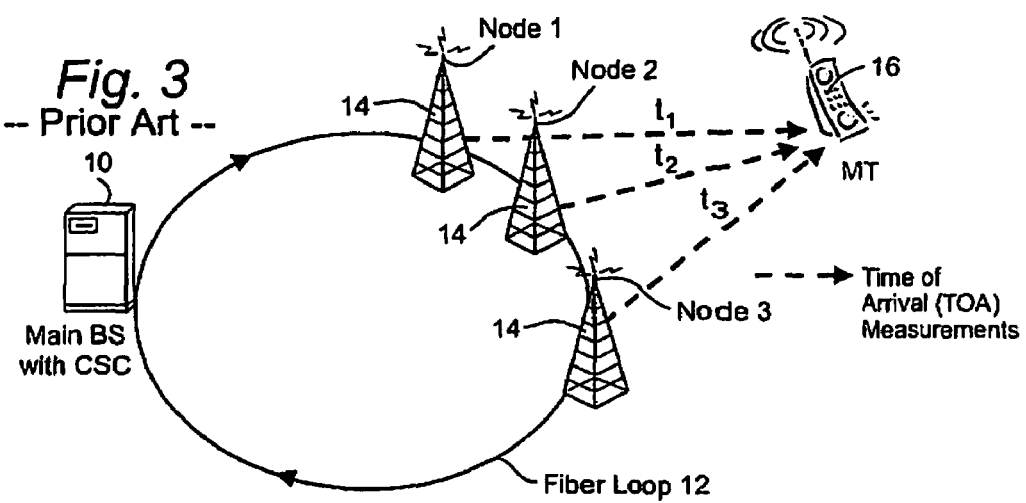
FIG. 3 illustrates three time of arrival (TOA) measurements made by the mobile terminal to be used in triangulation position calculations.

A third non-limiting example embodiment relates to temperature compensation to improve a mobile terminal's round-trip-time (RTT) position determination in a radio access network (RAN) that was a fiber ring configuration like that shown in FIGS. 2, 3, and 5. Uplink (UL) and downlink (DL) radio paths between a remote base station node and the mobile terminal can be assumed to be symmetrical. Therefore, as long as the link delays in the fiber loop from the remote BS node to the main BS node and back are known, they can be removed from the RTT determination.

In other words, in order for the mobile terminal to be able to determine its position using triangulation techniques based on time-of-arrival (TOA) measurements as illustrated in FIG. 3, the mobile terminal must know the round-trip time (RTT) for a radio signal to travel from the mobile terminal to the remote base station node and back. Since the remote base station node 14 is a "dumb" node, that RTT signal from the mobile terminal cannot be directly returned as soon as it is received at the remote node. Instead, the RTT signal must be sent around the fiber loop to the main base station node 10, which then forwards it on around the loop to the remote base station node, which then sends it back to the mobile terminal. The mobile terminal can determine the round-trip time (RTT), however, once the round-trip delay (RTD) associated with the fiber loop has been removed from the total time.

But the link delays associated with the optical fiber loop must be known with a high accuracy, e.g., equal to or better than $\pm T_c/2$ (a preferred valued might be $T_c/4$). In order to meet this requirement, temperature changes that vary the fiber delay must be accounted for. Consider a ring topology 50 km in circumference:

$T_c/4 = 65$ ns $= 75$ ps/° C./km·50 km·$\Delta T$ => $\Delta T = 17$° C.

In this example, a temperature change of 17° C. or more may jeopardize the accuracy required in this example. Temperature effects on time delay can be compensated for if the main node continually measures the roundtrip delay in the fiber ring. The most recently measured roundtrip delay value in the fiber ring, is subtracted from the overall time period from the mobile terminal to the remote node, to the main node, back to the remote node, and back to the mobile terminal. Such compensation can be performed in, e.g., the mobile station or in the main unit. OTDR is not necessary in this example RTT temperature compensation embodiment.

Figure 10:
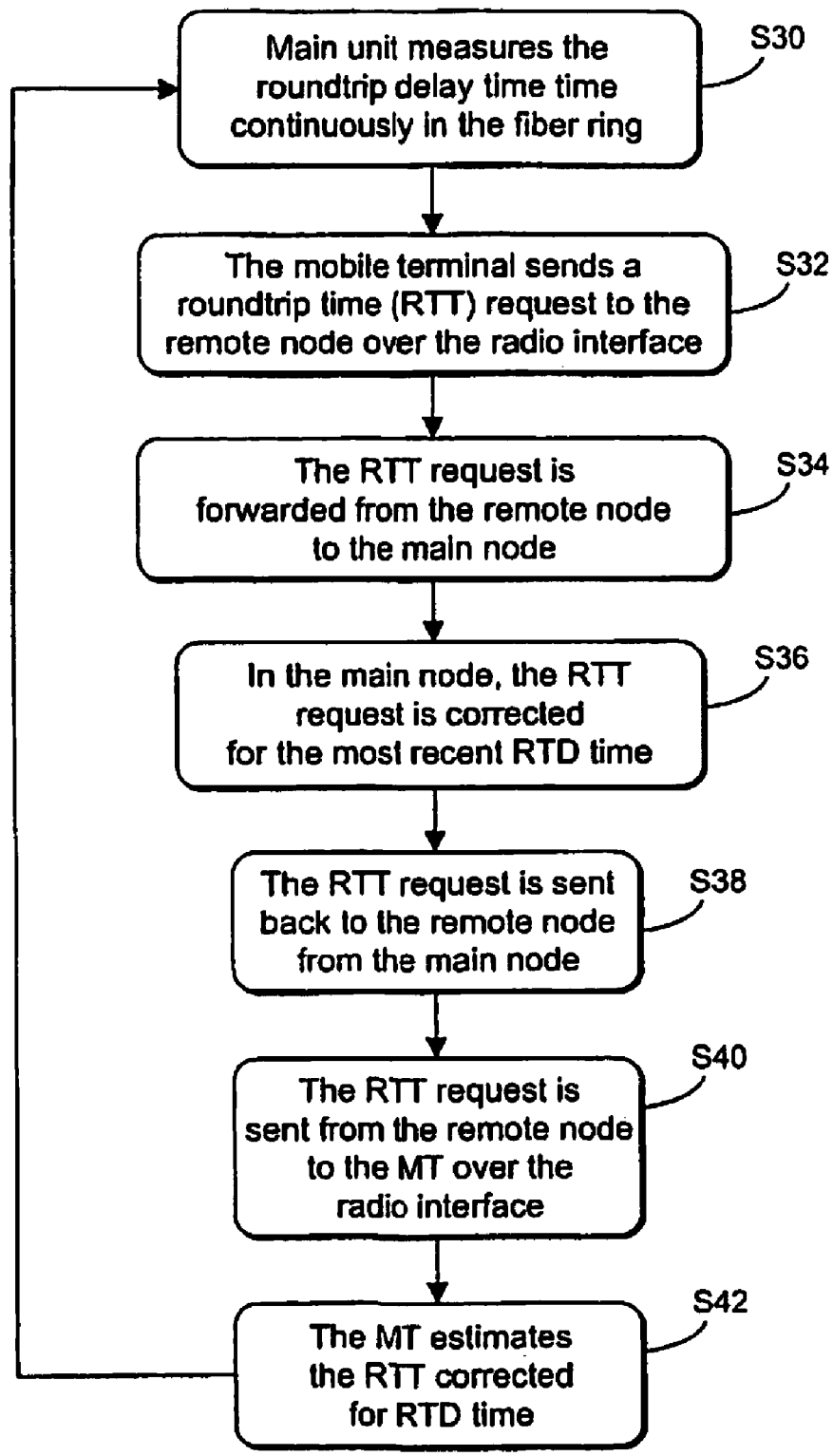
FIG. 10 is a flow chart diagram illustrating example procedures for a third, non-limiting, example embodiment.

FIG. 10 illustrates example procedures for the third example embodiment. The main base station node measures the round-trip delay (RTD) time continuously around the fiber loop (step S30). The mobile terminal sends a round-trip time (RTT) request to a remote base station node (step S32). The RTT request message is forwarded from the remote node to the main base station node (step S34). In the main node, the RTT request message is provided with the most recent round-trip delay (RTD) time (step S36). The RTT request message is sent back to the remote base station node from the main node (step S38). The RTT request message is then sent from the remote node to the mobile terminal over the radio interface (step S40). The mobile terminal then estimates the actual RTT corrected for round-trip delay (RTD) time included in the RTT message (step S42), and the process repeats.

Figure 11A:
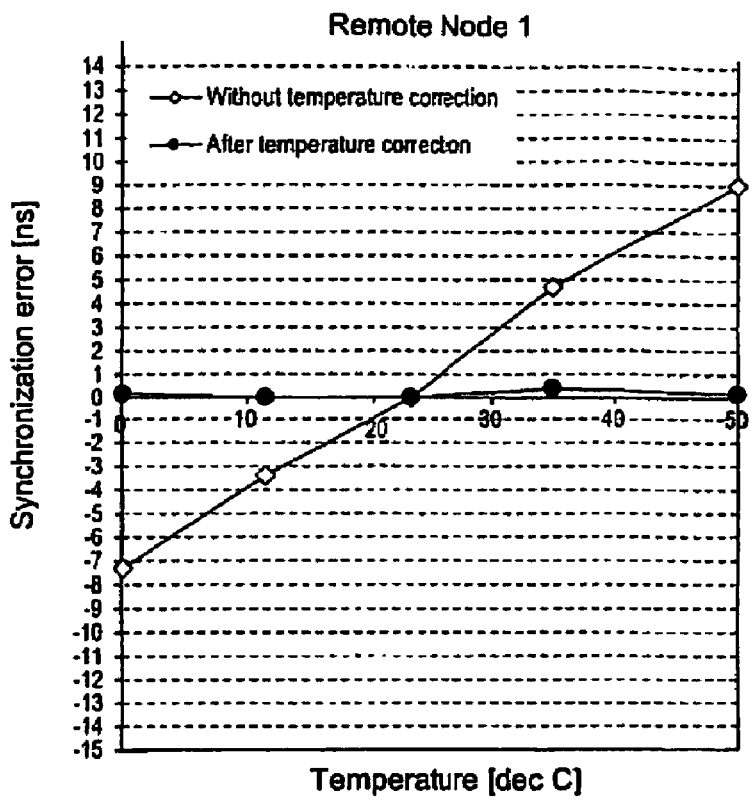
FIGS. 11A AND 11B illustrate graphs of synchronization error versus temperature with and without temperature correction at two different remote nodes.
Figure 11B:
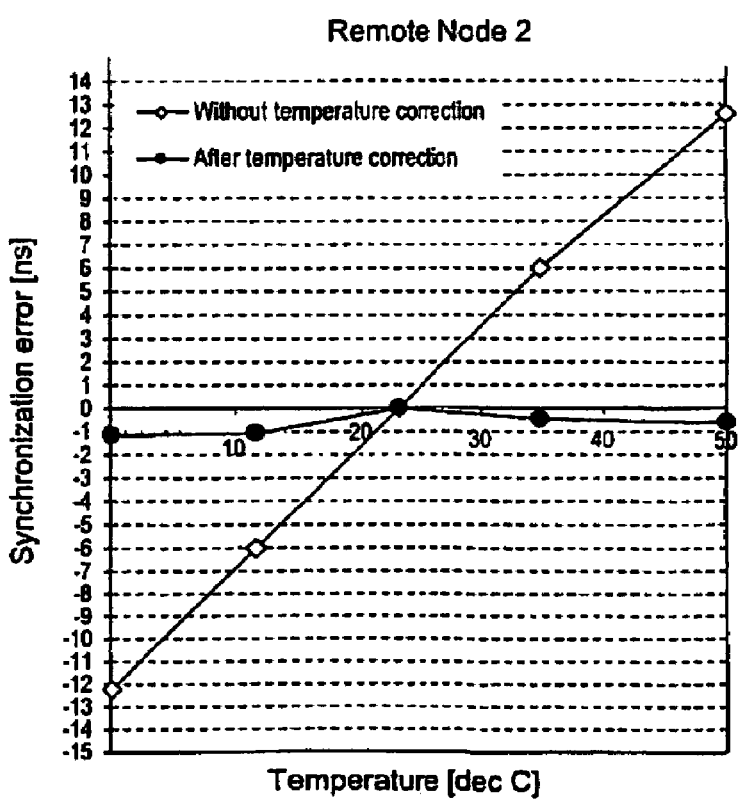

Compensation for temperature-induced effects on timing associated with the nodes in a unidirectional fiber ring topology has been described. Such compensation is important for a number of different applications and services, and a radio access network (RAN) is one important non-limiting example. The timing accuracy achievable with this technology, e.g., from a microsecond to a few microseconds, is acceptable for all presently known RAN services in the current UMTS environment. FIGS. 11A and 11B illustrate the benefits of this technology in a RAN main-remote base station synchronization application showing experimentally-obtained synchronization errors in a unidirectional fiber ring due to temperature variations both without and with temperature compensation for two different remote base station nodes 1 and 2 As seen in both Figures, the temperature-induced synchronization error was often about 10 ns if no temperature compensation was applied. Using temperature compensation resulted in a synchronization error smaller than 1 ns in most cases, i.e., an improvement by a factor of 10.

While the invention has been described in connection with example embodiments, it is to be understood that the invention is not to be limited to the disclosed embodiments, but on the contrary, is intended to cover various modifications and equivalent arrangements included within the scope of the appended claims.

What is claimed is:

1. A method for monitoring transmissions over a unidirectional optical fiber loop coupling multiple nodes wherein a first node is a main base station unit, including processing circuitry and a central clock source, and the one or more other nodes are remote base station units including radio transceiving circuitry for communicating over a radio interface with a mobile radio terminal, comprising the steps of:
    measuring a round trip delay time for a signal sent from said first node to travel around the unidirectional optical fiber loop and be received at the first node;
    using the measured round trip delay time to account for temperature induced affects on signal transmissions over the unidirectional optical fiber loop; and
    wherein the mobile terminal determines one or more round trip times (RTTs), said step further comprises:
        the mobile terminal sending an RTT message to one of the remote base station units over the radio interface;
        the one remote base station unit sending the RTT message to the main base station via the unidirectional optical fiber loop;
        the main base station unit modifying the RTT message with a recently determined round trip delay time that accounts for temperature induced delay variations in the loop;
        the main base station unit sending the modified RTT message to the remote base station via the unidirectional optical fiber loop;
        the remote base station unit transmitting the modified RTT message to the mobile terminal over the radio interface; and
        the mobile terminal determining the RTT based on the modified RTT message.

2. The method in claim 1, further comprising the steps of:
    measuring a first round trip delay time;
    subsequently measuring a second round trip delay time;
    determining a temperature-induced delay time correction based on the first and second round trip delay times; and,
    determining a time difference between the first node and one or more other nodes coupled to the unidirectional optical fiber loop based on the determined temperature-induced delay time correction.

3. The method in claim 2, further comprising the step of time synchronizing the multiple nodes taking into account the determined temperature-induced delay time correction.

4. The method in claim 3, wherein a time difference between the synchronized nodes is in the range of one nanosecond to several microseconds.

5. The method in claim 2, wherein adjacent nodes in the unidirectional optical fiber loop are coupled together by an optical fiber link, further comprising the steps of:
    determining a link time delay associated with one or more of the links; and,
    using one or more determined link time delays in determining one or more time difference between the first node and the one or more other nodes.

6. The method in claim 5, wherein optical time domain reflectometry is used in determining the time delay associated with each link.

7. The method in claim 5, wherein the temperature-induced delay time correction is based on a difference between the first and second round trip delay times and the one or more determined link time delays.

8. The method in claim 5, further comprising the steps of:
    generating a time synchronization message based on the temperature-induced delay time correction; and,
    sending the time synchronization message from the first node to a second of the nodes to permit the second node to adjust the absolute time at the second node to be synchronized with the absolute time at the first node.

9. The method in claim 5, further comprising the steps of:
    sending a timestamp message from one or more of the other nodes to the first node indicating a local time at that other node; and,
    determining a respective local time difference between the time in each received timestamp message and the local time at the first node.

10. The method in claim 1, wherein one or more links of the unidirectional fiber loop are subjected to temperature variations greater than those to which one or more other portions of the unidirectional fiber loop are subjected.

11. The method in claim 1, further comprising the step of calculating a temperature-induced delay time correction for one or more of the nodes other than the first node.

12. Apparatus for use in monitoring transmissions over a unidirectional optical fiber loop coupling multiple nodes wherein a first node is a main base station unit and the one or more other nodes are remote base station units including radio transceiving circuitry for communicating over a radio interface with a mobile radio terminal, comprising electronic circuitry operative to:
    measure a round trip delay time for a signal sent from a first node to travel around the unidirectional optical fiber loop and be received at the first node; and,
    account for temperature induced affects on signal transmissions over the unidirectional optical fiber loop using the measured round trip delay time; and
    determining one or more round trip times (RTTs) wherein
        the mobile terminal is configured to send an RTT message to one of the remote base station units over the radio interface;
        the one remote base station unit is configured to send the RTT message to the main base station unit via the unidirectional optical fiber loop;
        the main base station unit is configured to modify the RTT message with a recently determined round trip delay time that accounts for temperature induced delay variations in the loop;
        the main base station unit is configured to send the modified RTT message to the remote base station unit via the unidirectional optical fiber loop;
        the remote base station unit is configured to transmit the modified RTT message to the mobile terminal over the radio interface; and,
        the mobile terminal is configured to determine the RTT based on the modified RTT message.

13. The apparatus in claim 12, wherein the electronic circuitry is located in a first one of the nodes associated with a central system clock and is further configured to:
    determine a first round trip delay time;
    subsequently determine a second round trip delay time;
    determine a temperature-induced delay time correction based on the first and second round trip delay times; and, determine a time difference between the first node and one or more other nodes coupled to the unidirectional optical fiber loop based on the determined temperature-induced delay time correction.

14. The apparatus in claim 13, wherein the electronic circuitry is further configured to time synchronize the multiple nodes taking into account the determined temperature-induced delay time correction.

15. The apparatus in claim 12, wherein a time difference between the synchronized first and second nodes is in the range of one nanosecond to several microseconds.

16. The apparatus in claim 13, wherein adjacent nodes in the unidirectional optical fiber loop are coupled together by an optical fiber link, further comprising:

means for determining a link time delay associated with one or more of the links; and, wherein the electronic circuitry is further configured to use one or more determined link time delays in determining the time difference between the first node and one or more other nodes.

17. The apparatus in claim 14, wherein said means for determining uses optical time domain reflectometry in determining the time delay associated with each link.

18. The apparatus in claim 14, wherein the temperature-induced delay time correction is based on a difference between the first and second round trip delay times and the one or more determined link time delays.

19. The apparatus in claim 14, wherein the electronic circuitry is further configured to:

generate a time synchronization message based on the temperature-induced delay time correction; and, send the time synchronization message from the first node to a second of the nodes to permit the second node to adjust the absolute time at the second node to be synchronized with the absolute time at the first node.

20. The apparatus in claim 14, wherein one or more of the other nodes is configured to send a timestamp message to the first node indicating a local time at that other node; and, wherein the electronic circuitry is further configured to determine a respective local time difference between the time in each received timestamp message and the local time at the first node.

21. The apparatus in claim 12, wherein one or more links of the unidirectional fiber loop are subjected to temperature variations greater than those to which one or more other portions of the unidirectional fiber loop are subjected.

22. The apparatus in claim 12, wherein the electronic circuitry is further configured to calculate a temperature-induced delay time correction for one or more of the nodes other than the first node.

* * * * *